United States Patent [19]

Yamada et al.

[11] Patent Number: 5,342,545
[45] Date of Patent: Aug. 30, 1994

[54] POLYMER DISPERSION TYPE LIQUID CRYSTAL DISPLAY ELEMENT AND REFLECTION TYPE LIQUID CRYSTAL DISPLAY DEVICE

[75] Inventors: Nobuaki Yamada, Higashiosaka; Toshiyuki Hirai, Tenri; Noriaki Onishi, Osaka; Shuichi Kohzaki, Nara, all of Japan

[73] Assignee: Sharp Kabushiki Kaisha, Osaka, Japan

[21] Appl. No.: 999,138

[22] Filed: Dec. 31, 1992

[30] Foreign Application Priority Data

Mar. 6, 1992 [JP] Japan ................... 4-049601

[51] Int. Cl.5 ............... C09K 19/00; G02F 1/13; G02F 1/1347
[52] U.S. Cl. .................. 252/299.01; 428/1; 359/51; 359/53; 359/94; 359/96; 359/102
[58] Field of Search ............ 252/299.01, 299.1, 299.2; 428/1; 359/62, 70, 265, 267, 51, 53, 94, 96, 99, 102

[56] References Cited

U.S. PATENT DOCUMENTS 4,693,560 9/1987 Wiley ................... 359/103
5,194,973 3/1993 Isogai et al. ............ 359/53

FOREIGN PATENT DOCUMENTS

| 0488164 | 6/1992 | European Pat. Off. . |
| 59007341 | 1/1984 | Japan . |
| 2111921 | 4/1990 | Japan . |
| 3-46621 | 2/1991 | Japan . |
| 3-59515 | 3/1991 | Japan . |
| 3-52843 | 8/1991 | Japan . |
| 3-209425 | 9/1991 | Japan . |
| 4-9005 | 1/1992 | Japan . |
| 83/01016 | 3/1983 | World Int. Prop. O. . |
| 85/04262 | 9/1985 | World Int. Prop. O. . |

Primary Examiner—Shean Wu

[57] ABSTRACT

A polymer dispersion type liquid crystal display element includes two layers of polymer dispersion type liquid crystal layers being overlaid and having liquid crystal drops positive in dielectric anisotropy dispersed in a polymer in which light scattering and transmission are controlled electrically, a transparent support element for scattering light between the polymer dispersion type liquid crystal layers, being interposed and a liquid crystal display device having a colored reflector plate disposed on the back of one polymer dispersion type liquid crystal layer. In one of the two layers of polymer dispersion type liquid crystal layers, a liquid crystal layer containing a dichroic dye is dispersed, and coloring and light transmission are electrically controlled, and a white reflector plate is disposed on the back side of one of the polymer dispersion type liquid crystal layers to realize the liquid crystal display device. By composing the liquid crystal display element and liquid crystal display device in such constitutions, both light scattering capacity and contrast may be enhanced at the same time.

11 Claims, 1 Drawing Sheet

POLYMER DISPERSION TYPE LIQUID CRYSTAL DISPLAY ELEMENT AND REFLECTION TYPE LIQUID CRYSTAL DISPLAY DEVICE

BACKGROUND OF THE INVENTION

1. Field of the Invention

The present invention relates to a polymer dispersion type liquid crystal display element and reflection type liquid crystal display device. More particularly, the present invention relates to a polymer dispersion type liquid crystal display element for controlling the scatter of light occurring in the interface between the liquid crystal drop and polymer by electrically varying the refractive index between the liquid crystal drop and polymer, which is particularly useful when used in a monochromatic or color reflection type liquid crystal display device by disposing a reflector plate at the back side of the liquid crystal display element.

2. Description of the Related Art

Hitherto, the TN mode and STN mode are practically used, employing nematic liquid crystals as display elements making use of an electro-optical effect. The use of ferroelectric liquid crystal is also proposed. They require polarizer plates, and the utility efficiency of light is reduced to half by the polarizer plate, which causes the display to be dark. By contrast, for the display mode not requiring a polarizer plate, the phase transition guest-host mode utilizing absorption of light, the dynamic scatter (DS) mode utilizing scatter of liquid crystal, and the phase change (PC) mode are known.

Recently, for the mode requiring neither the polarizer plate nor orientation processing, the polymer dispersion type liquid crystal display mode has been proposed. An element for electrically controlling the transparent or turbid state is used by making use of the birefringence index of liquid crystal, that this is, basically, to match the refractive index of ordinary light of the liquid crystal molecule and the refractive index of the supporting medium such as a polymer, and to display the transparent state when the orientation of liquid crystals is aligned by applying a voltage, and to display a light scattering state due to disturbance of the orientation of liquid crystal molecules when no voltage is applied.

Proposals of the element of this mode include the liquid crystal encapsulated by a polymer capsule as disclosed in International Publication No. W083/01016, the liquid crystal drops formed within a resin by precipitating the liquid crystal by hardening the resin by mixing the liquid crystal with light or heat setting resin as disclosed in International Publication No. 85/04262, etc., the liquid crystal impregnated in a high polymer porous membrane as disclosed in Japanese Unexamined Patent Publication No. 3-59515 (KOKAI), etc., and the structure of floating polymer beads as a light scatter source in a liquid crystal between two transparent electrodes as disclosed in the Japanese Unexamined Patent Publication No. 3-46621 (KOKAI).

Moreover, the element for controlling the colored and transparent state by a voltage by applying a dichroic pigment to the liquid crystal portion of polymer dispersion type liquid crystal display element is disclosed in the Japanese Examined Patent Publication No. 3-52843 (KOKOKU).

As the color display element is disclosed in the Japanese Unexamined Patent Publication 3-209425 (KOKAI), the utilization of selective reflection of light is suggested by using the cholesteric liquid crystal or the cholesteric liquid crystal adding chiral dopant to the nematic liquid crystal, as the liquid crystal material of the polymer dispersion type liquid crystal display element. This use is realized by overlaying three polymer dispersion type liquid crystal display elements capable of displaying the primary colors of red, green and blue, respectively.

In the conventional polymer dispersion type liquid crystal display element, however, the scattering capacity was not sufficient, and the contrast was low. In particular, when used in the reflection type liquid crystal display device, a colored plate is needed on the back side, and since the light permeates slightly even through the scattering portion, the reflected light from the colored plate of the back side of the polymer dispersion type liquid crystal display element is recognized, and favorable display is not obtained.

To enhance the light scattering capacity, the size of the liquid crystal drop is optimized, but when the liquid crystal drop diameter is increased nearly to the wavelength of visible light in order to improve the scattering capacity, the driving voltage becomes high, and the range of utilization is limited. Alternatively by increasing $\Delta n$ of the liquid crystal material, the scattering capacity may be heightened regardless of the liquid crystal drop diameter, but no liquid crystal material has $\Delta n$ of over 0.3, and the enhancement of the scattering capacity is limited. Furthermore, by increasing the cell thickness, the scattering capacity may be heightened, but the distance between electrodes becomes long, which results in a higher driving voltage.

Thus, in the existing polymer dispersion type liquid crystal display element, it was difficult to enhance the light scattering capacity.

Furthermore, as proposed in the Japanese Patent Publication Hei. 3-52843, in the element for controlling the colored and transparent state by voltage by adding a dichroic pigment to the liquid crystal portion of the polymer dispersion type liquid crystal display element, the dichroic pigment itself absorbs light somewhat when oriented in the electric field direction, and the transparency is poor when the voltage is ON, and if a white reflector plate is used on the back side of the element, the white color is not sharp, and a sufficient contrast is not obtained.

SUMMARY OF THE INVENTION

It is hence a primary object of the invention to enhance the light scattering intensity of polymer dispersion type liquid crystal display element to a high degree, so that a sufficient contrast may be obtained when applied in a reflection type liquid crystal display device.

The invention therefore presents a polymer dispersion type liquid crystal display element characterized by positively dispersing liquid crystal drops in dielectric anisotropy in a polymer, overlaying at least two layers of polymer dispersion type liquid crystal layers for controlling the light scattering and transmission electrically, and interposing a transparent support element for scattering light between the polymer dispersion type liquid crystal layers.

In the invention, the thickness of the transparent support element for scattering light is 10 $\mu$m to 10 mm, preferably in a range of 50 to 200 $\mu$m, and the thickness of the polymer dispersion type liquid crystal layers is individually 5 to 18 μm, or preferably in a range of 10 to 15 μm.

The invention also presents a liquid crystal display device characterized by positively dispersing liquid crystal drops in dielectric anisotropy in a polymer, overlaying two layers of polymer dispersion type liquid crystal layers for controlling the light scattering and transmission electrically, interposing a transparent support element for scattering light between the polymer dispersion type liquid crystal layers, and disposing a colored reflector plate on the back side of one polymer dispersion type liquid crystal layer.

The invention moreover presents a liquid crystal display device characterized by overlaying and disposing a first polymer dispersion type liquid crystal layer dispersing liquid crystal drops in a polymer for controlling the light scatter and transmission electrically, and a second polymer dispersion type liquid crystal layer dispersing liquid crystal drops containing dichroic pigment in a polymer for controlling the coloring and light transmission electrically, interposing a transparent support element for scattering light between the first and second polymer dispersion type liquid crystal layers, and disposing a white reflector plate on the back side of the first or second polymer dispersion type liquid crystal layer.

The polymer dispersion type liquid crystal layers used in the invention are prepared by positively dispersing liquid crystals in the dielectric anisotropy in a polymer possessing the refractive index almost coinciding with the refractive index of ordinary light of the liquid crystal. While no voltage is applied, the director of the liquid crystal is bent by the warped curvature of the polymer, and the light is scattered, and when voltage is applied, the liquid crystal is oriented in the electric field direction, and the light passes through. By overlaying at least two layers of the polymer dispersion type liquid crystal layers, the light passing through the upper layer is further scattered by the next layer, so that the light scattering intensity is improved to high degree. Therefore, a high contrast not realized by one layer is obtained, so that it may be applicable to the reflection type liquid crystal display device.

The number of polymer dispersion type liquid crystal layers to be overlaid is determined by the purpose of use, but as the number of layers becomes smaller, a fewer number of driving circuits are needed for driving the cells, and the number of steps for adhering the liquid crystal layers is decreased, so that the cost is lower, and hence it is most preferred to combine two layers.

The transparent support element for scattering light interposed between the layer functions to expand the light passing through the upper layer of the polymer dispersion type liquid crystal layer, and to introduce into the next layer of the polymer dispersion type liquid crystal layer. As a result, the light scattering capacity in the next layer of the polymer dispersion type liquid crystal layer is enhanced, so that the scattering intensity is increased on the whole of the polymer dispersion type liquid crystal display element.

In the reflection type liquid crystal display device of the invention, a high contrast is obtained by disposing a colored reflector plate on the back side of one polymer dispersion type liquid crystal layer of the polymer dispersion type liquid crystal display element.

Moreover, in the reflection type liquid crystal display device of the invention, by setting the first polymer dispersion type liquid crystal layer in a scattering state and the second polymer dispersion type liquid crystal layer in a transparent state, a paper-white state is achieved by the white due to the scattering state of the first polymer dispersion type liquid crystal layer and the whiteness attributable to the reflector plate on the back side of the element, and therefore when the first polymer dispersion type liquid crystal layer is in the transparent state and the second polymer dispersion type liquid crystal layer is in the colored state, especially in black state, the colored state of the second polymer dispersion type liquid crystal layer is visible, and a favorable white and colored (black) state may be controlled.

Thus, according to the invention, in the polymer dispersion type liquid crystal display, the light scattering capacity is improved to a high degree, and when applied in a reflection type liquid crystal display element, a high contrast is obtained, so that the scope of application of polymer dispersion type liquid crystal elements in industrial products may be extended.

Also according to the invention, when the first polymer dispersion type liquid crystal layer is set in the scattering state and the second polymer dispersion type liquid crystal layer in the transparent state, a paper-white state is obtained by the white due to the scattering state of the first polymer dispersion type liquid Crystal layer and the whiteness attributable to the reflector plate on the back side of the element, and therefore when the first polymer dispersion type liquid crystal layer is in the transparent state and the second polymer dispersion type liquid crystal is in the colored state, especially in the black state, the colored state of the second polymer dispersion type liquid crystal layer is visible, so that a favorable colored (black) and white state may be controlled.

BRIEF DESCRIPTION OF THE DRAWING

Other and further objects, features, and advantages of the invention will be more explicit from the following detailed description taken with reference to the drawing wherein.

DETAILED DESCRIPTION OF THE PREFERRED EMBODIMENTS

Figure 1:
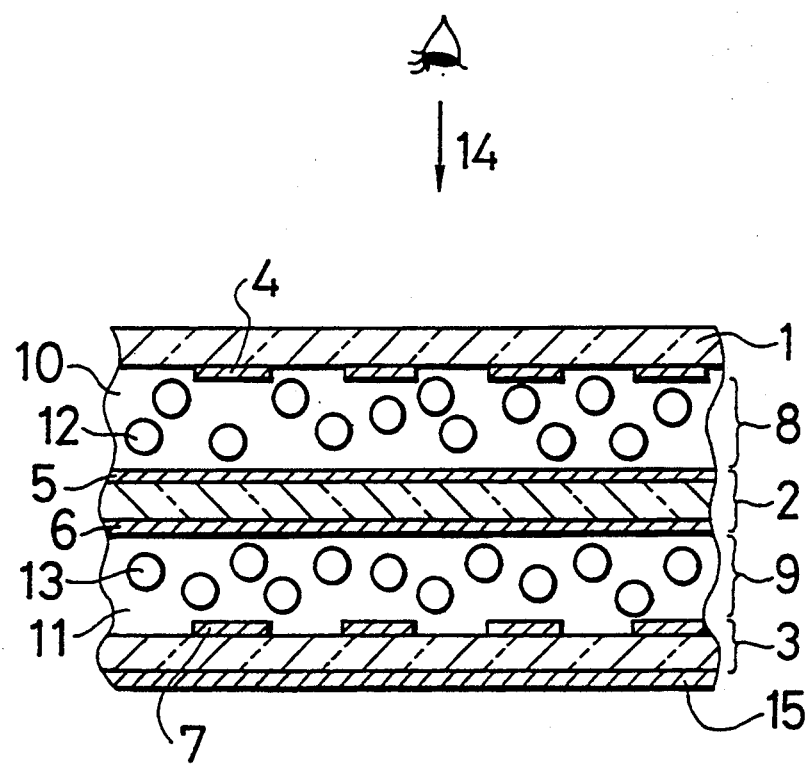
FIG. 1 is a sectional view of a polymer dispersion type liquid crystal element showing an embodiment of the invention.

Now referring to the drawing, the preferred embodiments of the invention are described below.

EXAMPLE 1

An embodiment of the invention is described in detail below by referring to FIG. 1. FIG. 1a shows a sectional view of the polymer dispersion type liquid crystal display element. In the diagram, numerals 1 and 3 are transparent substrates, 2 is a transparent support element for scattering light, 4, 5, 6, 7 are transparent electrodes, 8 and 9 are polymer dispersion type liquid crystal layers, 10 and 11 are polymers, 12 and 13 are liquid crystal drops dispersed in the polymers 10 and 11, 14 is a viewing direction, and 15 is a colored reflector film.

Here, the transparent support element for scattering light 2 functions to spread the transmitted light from the polymer dispersion type liquid crystal layer 8 and introduces the transmitted light into the polymer dispersion type liquid crystal layer 9. As a result, the light scattering capacity in the polymer dispersion type liquid crystal layer 9 is enhanced, thereby increasing the overall scattering intensity of the polymer dispersion type liquid crystal display element. Therefore, the thickness and material of the transparent support element for scattering light 2 are particularly important as one of the elements for determining the scattering intensity of the polymer dispersion type liquid crystal display element. The thickness of the transparent support element for scattering light 2 is preferred to be 10 μm to 10 mm. If the thickness is thinner than 10 μm, it is difficult to form the transparent electrodes 5 and 6 on the transparent substrate, and gluing of the transparent substrates 1 and 3 and other processes are difficult, which is not preferable. Or if the thickness of the transparent support element for scattering light 2 exceeds 10 mm, the distance from the polymer dispersion type liquid crystal layer 8 to the colored reflector film 15 is extended, and the viewing angle characteristic is extremely impaired. More preferably, the range of thickness should be 50 μm to 200 μm. The material of the transparent support element for scattering light 2 is particularly important, and is desired to be effective for further spreading the light scattered by the polymer dispersion type liquid crystal layer 8. For example, desired materials are transparent substrates combining a plurality of transparent substrates differing in the refractive index sequentially from the one having the smallest refractive index to the one having the greatest, and a microlens having a light diffusion effect, among others.

On one side of the transparent substrates 1 and 3 and both sides of the transparent support element for scattering light 2, 500 A ITO (a mixture of indium oxide and tin oxide) is formed as transparent electrodes 4, 5, 6, 7. At this time, the crossing parts of the transparent electrodes 4, 5, and of the transparent electrodes 6, 7 are picture elements, and it is formed so that the picture elements may be matched, as seen from the viewing angle direction 14, between the transparent substrate 1 and transparent support element for scattering light 2, and between the transparent substrate 3 and transparent support element for scattering light 2. Consequently, the transparent substrate 1 and transparent support element for scattering light 2, and the transparent substrate 3 and transparent support element for scattering light 2 are glued together to a gap of 5 to 18 μm, or preferably 10 to 15 μm. If this thickness is less than 5 μm, the light scattering performance without application of voltage is insufficient, or if this thickness is over 18 μm, to the contrary, the specified electric field intensity for driving the liquid crystal is insufficient, and enough transparency is not obtained when voltage is applied, or the driving voltage becomes high. The higher driving voltage corresponds to a higher power consumption, which gives rise to the necessity of improving the TFT and other driving circuits, and hence the higher driving voltage is not desired.

Here, the gap of the substrates is controlled to be 12 μm by a glass fiber of 12 μm in average diameter, and they are glued together with thermosetting resin.

Furthermore, polymer dispersion type liquid crystal layers 8 and 9 are formed. The forming method is to precipitate the liquid crystal by mixing and hardening the liquid crystal to thermal or photo setting resin, and to form liquid crystal drops 12, 13 in the polymers 10, 11. As the liquid crystal material, the nematic liquid crystal is desired because it is hardly colored and it hardly induces hysteresis, and the liquid crystal material containing chemically stable fluorine or chlorine liquid crystal materials is particularly desired. Dichroic pigments may be added to these liquid crystal materials.

The volume fraction of the liquid crystal drops 12, 13 in the polymers 10, 11 containing liquid crystal drops 12, 13 is desired to be 50% or more and 95% or less, and more preferably 70% or more and 85% or less. If the volume fraction of the liquid crystal drops 12, 13 is less than 50%, the number of times of scattering of the incident light by the liquid crystal drops 12, 13 is smaller, and a sufficient light scattering intensity is not obtained. Or if the volume fraction of the liquid crystal drops 12, 13 is over 95%, the volume fraction of the polymers 10, 11 decreases, and the physical strength of the polymer wall is lowered, and the polymer network cannot be formed and maintained.

Specifically, the resin used herein was a mixture of 0.3 g of trimethylol propane trimethacrylate, 1.7 g of butyl acrylate, and 0.06 g of irgacure 184 of Ciba-Geigy, and 8.0 g of 8 (Merck) was uniformly mixed as the liquid crystal material, and this material was injected between the transparent substrate 3 and transparent support element for scattering light 2. Then, an ultraviolet ray was emitted for 30 seconds at 60 mW/cm$^2$ under metal halide lamp to cure the resin, and the polymer dispersion type liquid crystal layer 9 was formed. To cure more completely, the resin was let stand in nitrogen for 1 hour at 60° in a dark place. Then, the same resin-liquid crystal material mixture was injected between the transparent substrate 1 and the transparent support element for scattering light 2, and an ultraviolet ray was emitted at 40 mW/m$^2$ so as not to pass through the preliminarily prepared polymer dispersion type liquid crystal layer 9 as heat treatment, and the polymer dispersion type liquid crystal layer 8 was formed and a polymer dispersion type liquid crystal display element was obtained.

For the polymer dispersion type liquid crystal display element thus prepared transparent, the substrate 1 and transparent support element 2 for scattering light 2, and the transparent substrate 3 and transparent support element for scattering light 2 were driven together respectively, and the electro-optical characteristics at this time were measured in an optical system with a focusing angle of 6° (Potal LCD-5000 by Otsuka Denshi), and the light transmissivity without voltage and with a voltage set at 50 V, 60 Hz (respectively $T_0$, $T_{50}$) was measured by the transmission method. As a result, this polymer dispersion type liquid crystal display element had the $T_0$ of 0.2% or less below the limit of measurement, and $T_{50}$ of 78.2%, and a favorable contrast was obtained.

This polymer dispersion type liquid crystal display element may be used as a reflection type liquid crystal display device by disposing a colored reflector plate at the back side. The reflection type liquid crystal display device is expected to be highly used as a handy type liquid crystal display element of low power consumption, light weight and high impact resistance, when the substrate is a plastic film, without requiring back light. As the colored reflector plate, assuming a monochromatic display, a black scattering plate, a reflector mirror, more preferably a partial reflector mirror combining a half mirror and a black plate, and a partial reflector plate combining a high mesh mirror and a black plate are used. Assuming a color display, colored reflector plates corresponding to red, green and blue may be used, and preferably, a partial reflector mirror combining a half mirror and colored plates corresponding to red, green and blue, and a partial reflector plate combining a high mesh mirror and colored plates corresponding to red, green and blue may be used.

Herein, the reflection type liquid crystal device was fabricated by forming a black reflector film 15 on the back side of the polymer dispersion type liquid crystal display element by spraying black paint for the colored reflector plate. When the transparent substrate 1 and transparent support element for scattering light 2, and the transparent substrate 3 and transparent support element for scattering light 2 were driven together, the reflection of light was 4.2% in the ON state, and 69.8% in the OFF state, and a reflection type liquid crystal display device presenting a favorable contrast was obtained.

As the liquid crystal material, aside from the liquid crystal material disclosed in the embodiment, for example, ZLI-4792, ZLI-4718, ZLI-4749, E-44, ZLI-1289 (made by Merck) may be used. Besides, by driving independently the transparent substrate 1 and transparent support element for scattering light 2, and the transparent substrate 3 and transparent support element for scattering light 2, a multi-gradation display impossible in a single layer is realized.

Comparison 1

A pair of substrates similar to transparent substrates 1 and 3 possessing transparent electrodes in Example 1 were glued together with a thermosetting resin and controlled to a thickness of 12 μm by a glass fiber of 12 μm in average diameter.

A resin-liquid crystal mixture similar to the resin in Example 1 was injected, and the resin was cured by ultraviolet rays at an irradiation intensity of 40 mW/cm$^2$. The resin was further heated to prepare a polymer dispersion type liquid crystal display element.

The electro-optical characteristics of this polymer dispersion type liquid crystal display element were measured by the transmission method similar to Example 1, and, as a result, $T_0$ was 15.5% and $T_{50}$ was 80.1%.

EXAMPLE 2

A second embodiment is described below by referring to FIG. 1.

The characteristics in this mode are that the polymer dispersion type liquid crystal layer 8 is set in a scatter-transmission mode, that the polymer dispersion type liquid crystal layer 9 is a set in colored-transmission mode containing dichroic dye, and that a white reflector film is disposed on the back side of the polymer dispersion type liquid crystal display element.

Similar to Example 1, transparent electrodes 4, 5, 6, 7 are formed on the transparent substrates 1 and 3 and the transparent support element for scattering light 2. Then the transparent substrate 1 and transparent support element for scattering light 2 are glued together with a thermosetting resin by controlling the thickness to 12 μm by a glass fiber of 12 μm in average particle size. A resin-liquid crystal mixture similar to the mixture in Example 1 is injected, and the resin is cured by ultraviolet rays at an irradiation intensity of 40 mW/cm$^2$, and is further heated to obtain a polymer dispersion type liquid crystal layer 8.

On the other hand, on the transparent electrode 7 of the transparent substrate 3, a polymer dispersion type liquid crystal layer 9 containing dichroic dye in the liquid crystal drop 13 is formed. As the dichroic pigment, the material having the dichroic ratio of at least 5, and preferably 6 or more is suited, and for example, merocyanine, anthraquinone, styryl, and azobenzene compounds may be used.

Herein, specifically, to a mixed solution of 1.0 g of E8 (Merck) and 0.05 g of black dichroic pigment (S-301, Mitsui Toatsu Senryo), a uniformly dissolved solution of 0.25 g of methyl polymethacrylate (Delpet, Asahi Kasei) and 30 g of chloroform was applied by bar coating method to a thickness of about 12 μm after drying in the air, and a polymer dispersion type liquid crystal layer 9 was formed by drying in nitrogen.

The polymer dispersion type liquid crystal layer 9 side of the transparent substrate 3 was glued to the transparent support element for scattering light 2, and a white paint containing titanium oxide was applied as a white reflector plate to the back side of the transparent substrate 3 instead of the colored reflector film 15, and a white reflector film was formed, and a reflection type liquid crystal display device was fabricated.

To drive this device, the voltage (60 Hz) is varied so that the polymer dispersion type liquid crystal layer 9 may be ON or in a transparent state when the polymer dispersion type liquid crystal layer 8 is OFF or in a scattering state, and that the polymer dispersion type liquid crystal layer 9 may be OFF or in a black state when the polymer dispersion type liquid crystal layer 8 is ON or in a transparent state. As a result, in the former state, a paper-white display is achieved by the scattered light of the polymer dispersion type liquid crystal layer 8 and the light passing through the polymer dispersion type liquid crystal layer 9, scattered and reflected by the back side reflector film, and further scattered by the polymer dispersion type liquid crystal layer 8. In the latter state, the light passing through the polymer dispersion type liquid crystal layer 8 is absorbed by the darkened polymer dispersion type liquid crystal layer 8, and a black display is shown, so that a favorable monochromatic display element is achieved.

As the electro-optical characteristics of this reflection type liquid crystal display device, the light reflection was 75.4% in the white state and 3.5% in the black state, and a favorable contrast was shown.

Herein, the transparent support element for scattering light may be replaced by the same material as the transparent substrates 1 and 3.

Or, instead of the polymer dispersion type liquid crystal layer 9 mixing a pigment in the liquid crystal drop, the White Taylor type guest-host mode or the like may be electrically controlled in a transparent-colored state.

Moreover, by disposing a white reflector film 15 at the transparent substrate 1 side, a reflection type liquid crystal display device as seen from the direction of substrate 3 may be fabricated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A polymer dispersion type liquid crystal display element comprising:
   two layers of polymer dispersion type liquid crystal layers which comprise a polymer and liquid crystal drops positively dispersed in dielectric anisotropy in said polymer;

at least said two layers overlaid one over another for controlling the light scattering and transmission electrically with a range of thickness for said polymer dispersion type liquid crystal layers comprising 5 μm to 18 μm; and a transparent support element for scattering light interposed between said polymer dispersion type liquid crystal layers with a range of thickness for said transparent support element for scattering light comprising 10 μm to 10 mm.

2. A polymer dispersion type liquid crystal display element of claim 1, wherein said range of thickness for said transparent support element for scattering light comprises 50 μm to 200 μm, and said range of thickness for said polymer dispersion type liquid crystal layers comprises 10 μm to 15 μm.

3. A reflection type liquid crystal display device comprising:

two layers of polymer dispersion type liquid crystal layers which comprise a polymer and liquid crystal drops positively dispersed in dielectric anisotropy in said polymer;

at least said two layers overlaid one over another for controlling the light scattering and transmission electrically with a range of thickness for said polymer type liquid crystal layers comprising 5 μm to 18 μm;

a transparent support element for scattering light interposed between said polymer dispersion type liquid crystal layers with a range of thickness for said transparent support element for scattering light comprising 10 μm to 10 μmm; and a colored reflector plate disposed on the back side of one of said polymer dispersion type liquid crystal 4. A reflection type liquid crystal display device comprising:

a first polymer dispersion type liquid crystal layer dispersing liquid crystal drops in a polymer for controlling the light scatter and transmission electrically with a range of thickness for said first polymer dispersion type liquid crystal layer comprising 5 μm to 18 μm;

a second polymer dispersion type liquid crystal layer dispersing liquid crystal drops containing dichroic dye in a polymer for controlling the coloring and light transmission electrically with a range of thickness for said second polymer dispersion type liquid crystal layer comprising 5 μm to 18 μm;

a transparent support element for scattering light interposed between said first and second polymer dispersion type liquid crystal layers with a range of thickness for said transparent support element for scattering light comprising 10 μm to 10 mm; and a white reflector plate disposed on the back side of said first or second polymer dispersion type liquid crystal layer.

5. A polymer dispersion type liquid crystal display element of claim 1, wherein the material of said transparent support element for scattering light comprises a transparent substrate combining a plurality of transparent substrates differing in refractive index sequentially from one transparent substrate having the smallest refractive index to another transparent substrate having the largest refractive index and a microlens having a light diffusion effect.

6. A method of forming a polymer dispersion type liquid crystal display element, comprising the steps of:

(a) positively dispersing liquid crystal drops in dielectric anisotropy in a polymer with two layers of polymer dispersion type liquid crystal layers comprising said polymer and said liquid crystal drops;

(b) overlaying at least said two layers one over another for controlling the light scattering and transmission electrically;

(c) forming a thickness for said polymer dispersion type liquid crystal layers comprising a range from 5 μm to 8 μm;

(d) interposing a transparent support element for scattering light between said polymer dispersion type liquid crystal layers; and (e) forming a thickness for said transport support element for scattering light comprising a range from 10 μm to 10 mm.

7. A method of forming a polymer dispersion type liquid crystal display element of claim 1, wherein said thickness range for said polymer dispersion type liquid crystal layers formed at said step (c) comprises 10 μm to 15 μm.

8. A method of forming a polymer dispersion type liquid crystal display element of claim 1, wherein said thickness range for said transparent support element for scattering light at said step (e) comprises 50 μm to 200 μm.

9. A method of forming a polymer dispersion type liquid crystal display element of claim 1, further comprising the step of disposing a colored reflector plate on the back side of one of said polymer dispersion type liquid crystal layers.

10. A method of forming a polymer dispersion type liquid crystal display element of claim 6, wherein the material of said transparent support element for scattering light comprises a transparent substrate combining a plurality of transparent substrates differing in refractive index sequentially from one transparent substrate having the smallest refractive index to another transparent substrate having the largest refractive index and a microlens having a light diffusion effect.

11. A method of forming a reflection type liquid crystal display device, comprising the steps of:

(a) overlaying and disposing a first polymer dispersion type liquid crystal layer dispersing liquid crystal drops in a polymer for controlling the light scatter and transmission electrically;

(b) forming a thickness of said first polymer dispersion type liquid crystal layer comprising a range from 5 μm to 18 μm;

(c) overlaying and disposing a second polymer dispersion type liquid crystal layer dispersing liquid crystal drops containing dichroic dye in a polymer for controlling the coloring and light transmission electrically;

(d) forming a thickness of said second polymer dispersion type liquid crystal layer comprising a range from 5 μm to 18 μm;

(e) interposing a transparent support element for scattering light between said first and second polymer dispersion type liquid crystal layers;

(f) forming a thickness of said transparent support element for scattering light comprising a range from 10 μm to 10 mm; and (g) disposing a white reflector plate on the back side of said first or second polymer dispersion type liquid crystal layer.

* * * * *